US009738238B2

(12) United States Patent
Bouillon

(10) Patent No.: US 9,738,238 B2
(45) Date of Patent: Aug. 22, 2017

(54) FOOTREST INCORPORATING MEANS FOR STORING TYRE REPAIR EQUIPMENT

(71) Applicant: RENAULT s.a.s., Boulogne Billancourt (FR)

(72) Inventor: Jean-Charles Bouillon, La Queue lez Yvelines (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/895,721

(22) PCT Filed: Jun. 3, 2014

(86) PCT No.: PCT/FR2014/051312
§ 371 (c)(1),
(2) Date: Dec. 3, 2015

(87) PCT Pub. No.: WO2014/199047
PCT Pub. Date: Dec. 18, 2014

(65) Prior Publication Data
US 2016/0121808 A1    May 5, 2016

(30) Foreign Application Priority Data
Jun. 13, 2013 (FR) ...................... 1355492

(51) Int. Cl.
*B60R 11/06* (2006.01)
*B60N 3/06* (2006.01)
*B60R 7/04* (2006.01)

(52) U.S. Cl.
CPC ............... *B60R 11/06* (2013.01); *B60N 3/06* (2013.01); *B60R 7/04* (2013.01)

(58) Field of Classification Search
CPC .............. B60R 11/06; B60R 7/04; B60N 3/06
(Continued)

(56) References Cited

U.S. PATENT DOCUMENTS

| 6,230,949 B1 | 5/2001 | O'Connell et al. |
| 2008/0143137 A1* | 6/2008 | Bowen ................. B60N 2/0232 296/75 |
| 2011/0241374 A1* | 10/2011 | Graves .................... B60N 3/06 296/75 |

FOREIGN PATENT DOCUMENTS

| FR | 2 981 310 A1 | 4/2013 |
| JP | 2002-127835 A | 5/2002 |

OTHER PUBLICATIONS

International Search Report Issued Oct. 7, 2014 in PCT/FR14/51312 Filed Jun. 3, 2014.
(Continued)

*Primary Examiner* — Joseph D Pape
(74) *Attorney, Agent, or Firm* — Oblon, McClelland, Maier & Neustadt, L.L.P.

(57) ABSTRACT

A footrest to be installed between a bulkhead and a floor of a motor vehicle includes a bearing wall to support the foot or feet of a passenger and a sound insulation mat extending opposite at least part of the bearing wall and attached to the floor. The mat includes an insulating layer between the floor and a covering layer attached to the insulating layer. The bearing wall includes a storage compartment and an internal face positioned facing an exterior face of the covering layer at installation of the foot rest. The storage compartment extends between the internal face of the bearing face and the exterior face of the covering layer. The storage compartment has a bottom wall fixed permanently to the internal face of the bearing wall by first, and second connecting members and includes housings the content of which is directly accessible without removing the storage compartment.

12 Claims, 5 Drawing Sheets

(58) Field of Classification Search
USPC .......................................................... 296/75
See application file for complete search history.

(56) References Cited

OTHER PUBLICATIONS

French Search Report Issued Feb. 18, 2014 in FR 1355492 Filed Jun. 13, 2013.

* cited by examiner

FOOTREST INCORPORATING MEANS FOR STORING TYRE REPAIR EQUIPMENT

BACKGROUND

The invention relates to a footrest designed to be installed between a part of a bulkhead and a floor of a motor vehicle, comprising a bearing wall designed to receive the foot or feet of a passenger of the motor vehicle and a sound insulation mat capable of extending opposite at least one part of said bearing wall and attached to the floor of the motor vehicle, said mat comprising an insulating layer interposed between the floor and a covering layer attached to said insulating layer, the bearing wall further comprising at least one storage compartment, the bearing wall comprising an internal face designed to be positioned opposite an external face of the covering layer during the installation of the footrest and the storage compartment extending between said internal face of the bearing face and the external face of the covering layer.

A footrest designed to be installed between a part of a bulkhead and a floor of a motor vehicle is disclosed in the unpublished patent application FR1159368, comprising a member serving as a support and provided with a bearing face designed to receive the foot or feet of a passenger of the motor vehicle and a sound insulation mat capable of extending opposite at least one part of said bearing wall and attached to the floor of the motor vehicle, said mat comprising an insulating layer interposed between the floor and a covering layer attached to said insulating layer, the member serving as a support further comprising at least one storage compartment for equipment used for the repair of tires of the vehicle, the bearing face comprising an internal face designed to be positioned opposite an external face of the covering layer during the installation of the footrest and the internal face being provided with connecting members designed to support the storage compartment such that the internal volume of the storage compartment extends between the internal face of the bearing face and the external face of the covering layer. The connecting members are provided so that once the footrest is removed the compartment is able to pivot, so that it is possible to access the equipment used for the repair of tyres.

However, this device has drawbacks.

The mobile part of the compartment is heavy as it needs to be very thick and to have a significant network of ribs in order to be sufficiently rigid to be able to support the objects which the compartment contains without yielding or without being broken. Moreover, the mobile elements tend to be more fragile during use than fixed elements (risk of damage to the hinges or clips for retaining the mobile part, for example).

Moreover, the storage and removal of the objects inside the compartment is not easy as the compartment tends to fall to one side or the other, depending on the objects already present in the compartment.

BRIEF SUMMARY

In order to remedy these drawbacks, the subject of the invention is a footrest incorporating a storage compartment for equipment used for repairing tyres, which is robust, lightweight and practical.

To this end, the invention proposes a footrest of the aforementioned type, characterized in that the storage compartment has a bottom wall fixed permanently to the internal face of the bearing wall by first and second connecting members and comprising housings, the contents thereof being directly accessible without dismantling the storage compartment.

According to further features of the invention:
the first connecting members are fixed clips borne by the internal face of the bearing wall and capable of cooperating with complementary orifices formed in the bottom wall of the compartment,
the second connecting members are fingers borne by the bottom wall of the compartment and capable of cooperating with arcuate portions borne by the bearing wall,
the bottom wall comprises at least one housing molded according to a predetermined shape, corresponding to the shape of at least one piece of equipment used for the repair of tyres of the motor vehicle,
a first housing for receiving a container for a sealing product having a cylindrical body consists of at least one wall substantially perpendicular to the bottom wall, one free edge thereof opposing the bottom wall being extended by a flexible blade having a circular-arc-shaped profile capable of cooperating with the cylindrical body of the container for the sealing product, by being held under tension,
the terminal edge of the flexible blade is raised so as to form a locking means capable of cooperating with the mat when the footrest is in the mounted position,
the first housing further comprises lateral walls extending substantially perpendicular to the bottom wall from the first wall of the housing and capable of cooperating with end faces of the container for the sealing product,
a free edge, opposing the bottom wall, of the lateral walls of the first housing have a resilient internal folded-over portion capable of being held under tension against the end faces of the container for the sealing product,
a second receiving housing capable of receiving a compressor of substantially parallelepipedal shape is delimited by recesses formed in lateral safety blocks borne by the bottom wall and capable of receiving corners of the compressor via rear clips which are formed in the bottom wall between the safety blocks and which are capable of cooperating with a rib borne by a peripheral lateral wall of the compressor and front lateral clips capable of cooperating with the rib of the lateral peripheral wall,
a third housing for receiving a towing ring consists of at least one pair of clips formed in the bottom wall and opposing one another to delimit a first groove capable of receiving the shank of the towing ring and two concentric circular-arc-shaped walls formed in the bottom wall and delimiting a second groove capable of receiving the annular part of the towing ring,
a fourth housing for receiving a hub cap hook consists of two clips aligned transversely and formed in the bottom wall, designed to receive a portion of the head of the hook, and at least one further clip formed in the bottom wall and capable of receiving the shank of the hook,
the bearing wall comprises at its upper end removable fixing means consisting of a pin welded to the bulkhead and a butterfly nut.

BRIEF DESCRIPTION OF THE DRAWINGS

Further features and advantages of the invention will become apparent from reading the description of exemplary embodiments of a footrest with reference to the accompanying drawings, in which.

DETAILED DESCRIPTION

Figure 1:
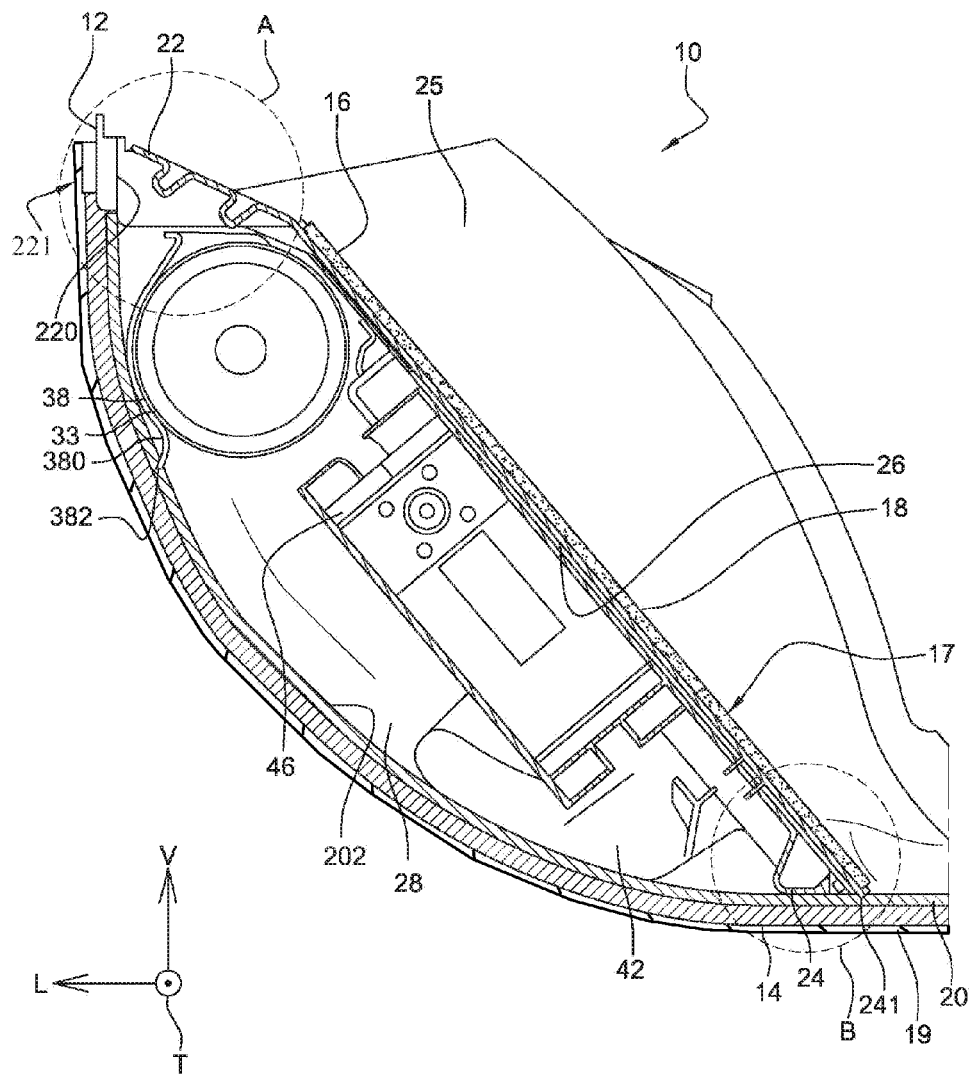
FIG. 1 is a sectional view of the footrest in the mounted position in the vehicle.
Figure 2:
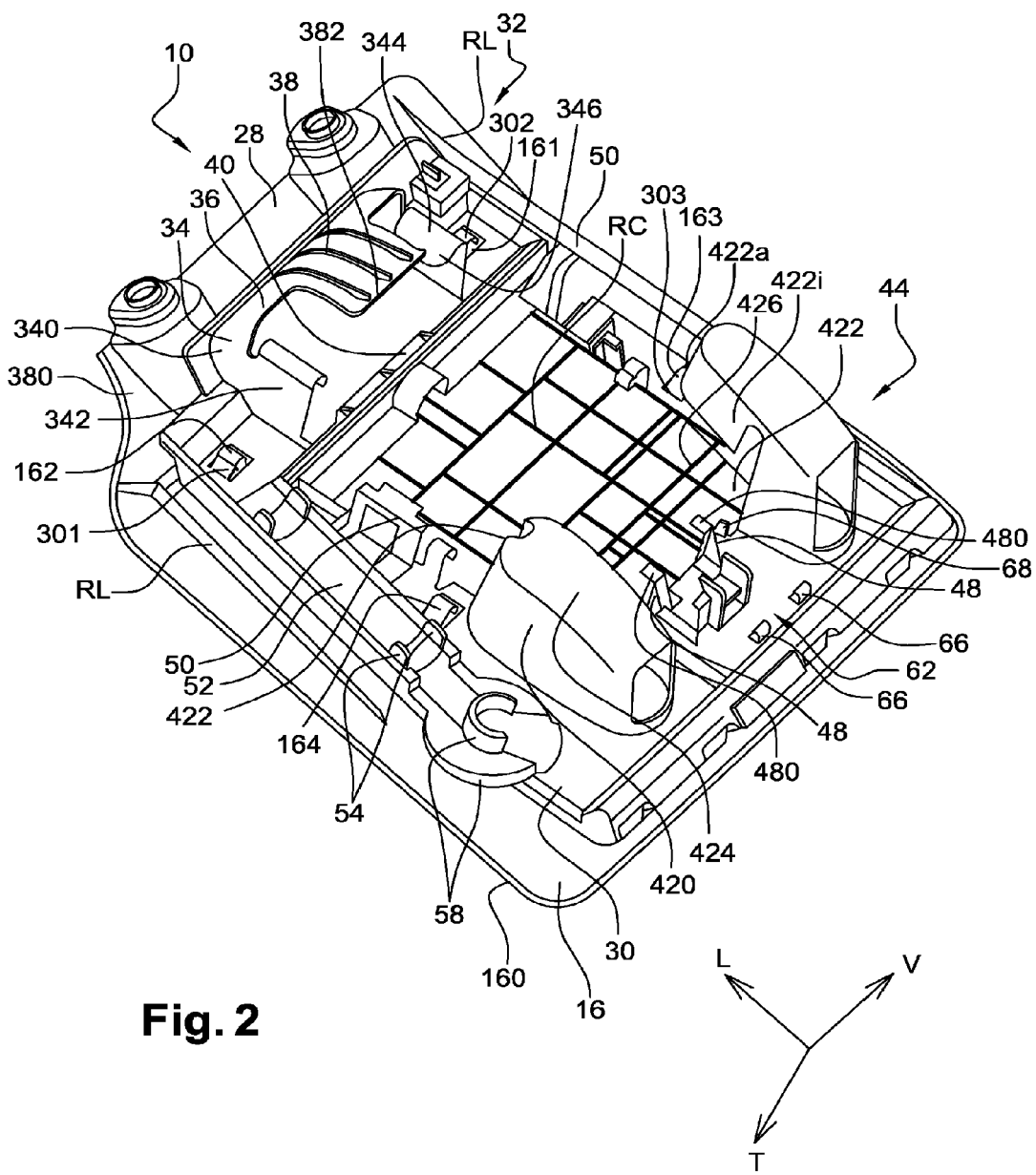
FIG. 2 is a view of the inside of the footrest comprising the storage compartment according to the invention, shown in the empty and reversed state.
Figure 3:
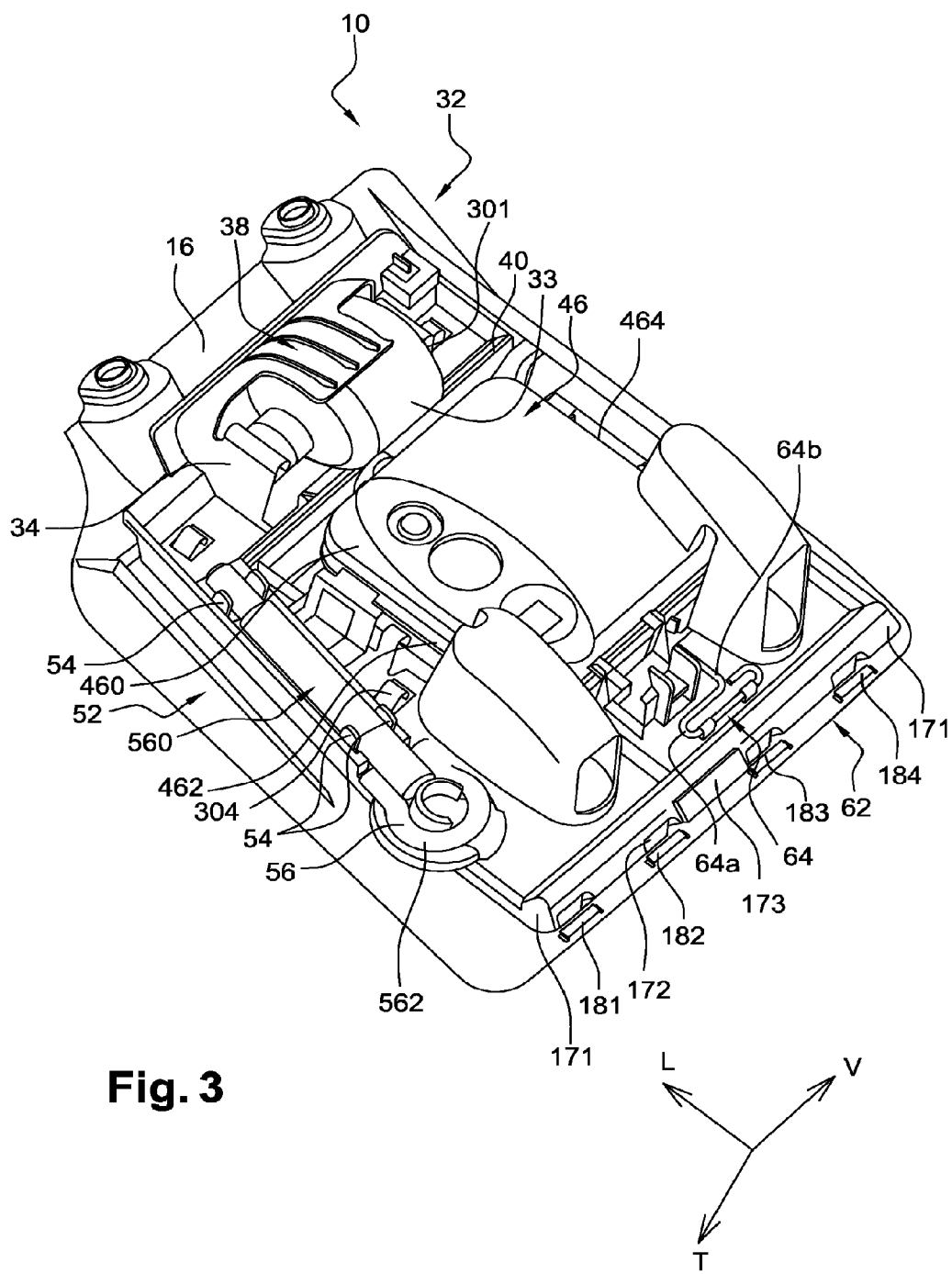
FIG. 3 is a view of the footrest of FIG. 2, the compartment being shown in the full and reversed state.
Figure 4:
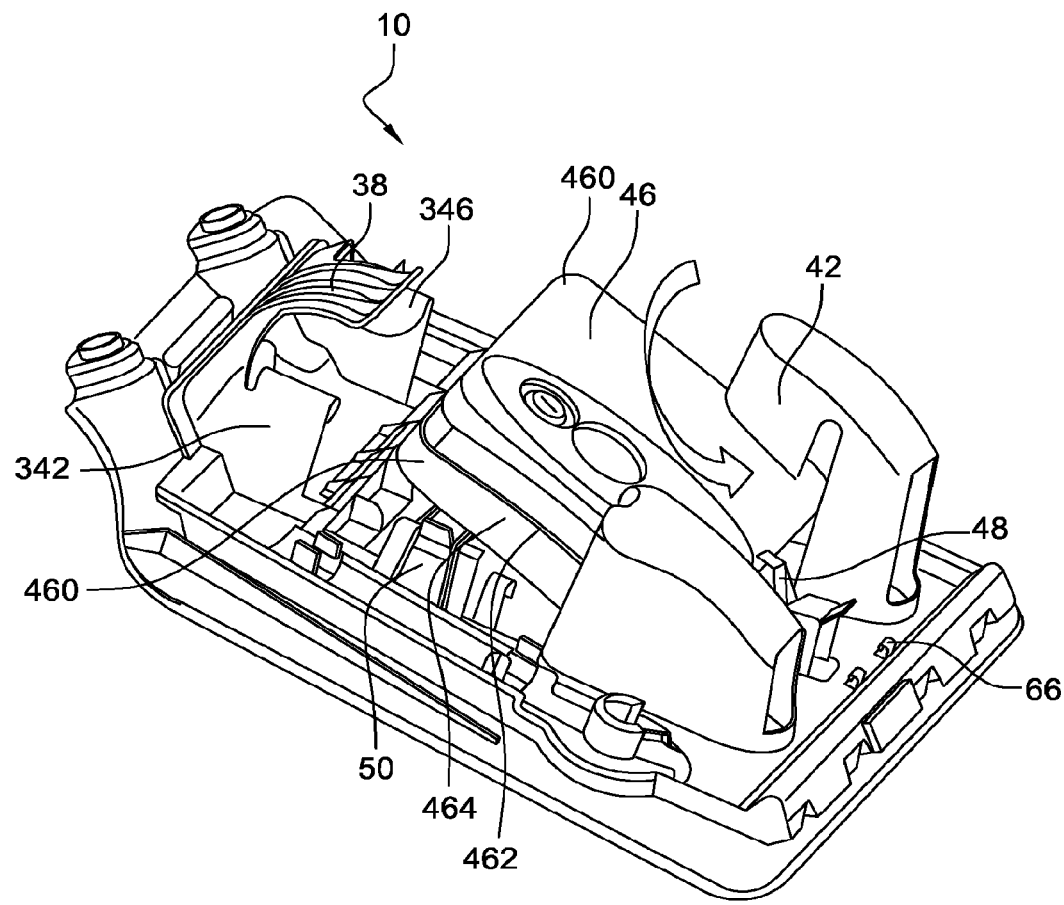
FIG. 4 is a view of the footrest of FIGS. 2 and 3, an object in the process of being inserted therein being shown.
Figure 5:
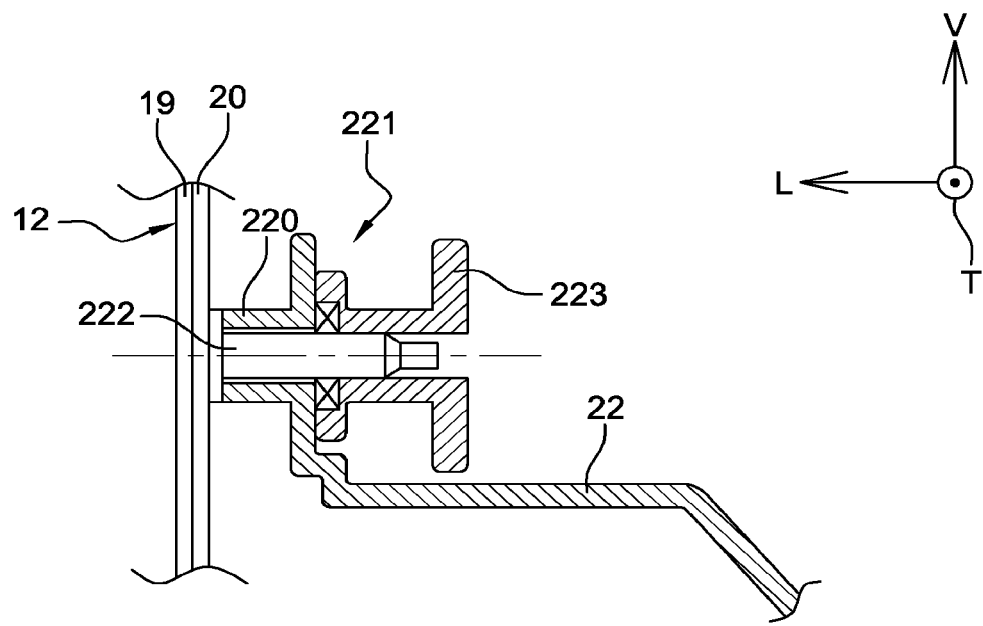
FIG. 5 is a lateral sectional view of the detail A of FIG. 1.
Figure 6:
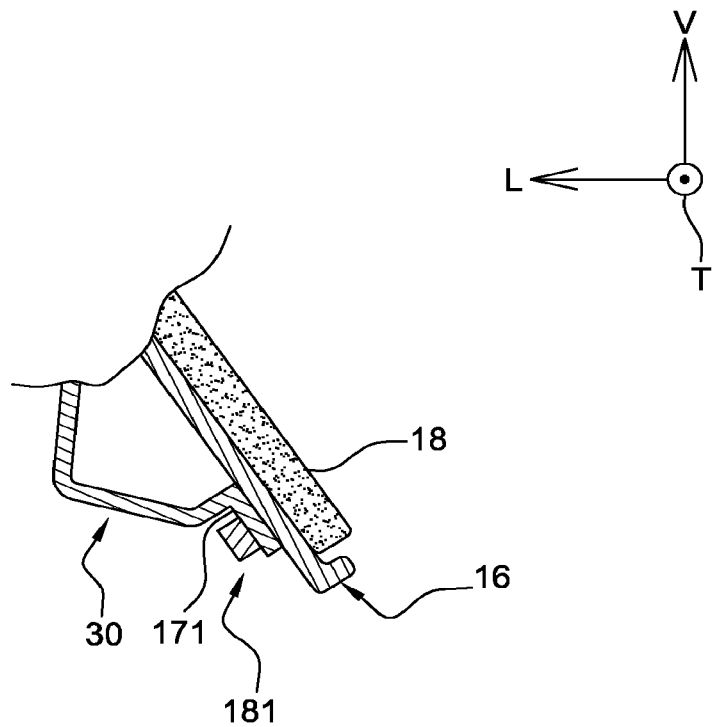
FIG. 6 is a lateral sectional view of the detail B of FIG. 2.

In the following description a longitudinal, vertical and transverse orientation indicated by the trihedron L, V, T of FIGS. 1 to 6 will be regarded as non-limiting.

Elements which are identical or similar are denoted by the same reference numerals.

With the exception of specific elements of the driver's compartment, the vehicle has an overall symmetry relative to a median longitudinal plane.

As shown in FIG. 1, a footrest 10 is installed between a lower part 12 of a bulkhead and a floor 14 of the vehicle, inside the passenger compartment of the vehicle, and comprises a rigid planar bearing wall 16 which is inclined toward the front so that it is able to receive the feet of an occupant of the vehicle.

The external face 17 of the bearing wall 16 may be covered by a covering layer 18 of the textile or rubber type so as to meet requirements in terms of external appearance or use.

The external face 17 of the bearing wall 16 may also be quite simply embossed and have patterns in relief, which makes it possible to reduce costs but also to obtain an increase in weight.

The floor 14 and the lower part 12 of the bulkhead are in turn covered by an insulating layer 19, which is in turn covered by an external covering layer 20 of the carpet type.

The footrest 10 is also designed to be installed in the vehicle by being arranged directly on the covering layer 20 covering the floor 14 and the lower part 12 of the bulkhead and is designed to be able to be very easily mounted and dismantled from this installed position.

The rigid bearing wall 16 is provided to be connected in the region of its upper end 22 and at the lower part of the bulkhead 12 by at least one removable fixed connection 221. According to the exemplary embodiment illustrated in FIG. 5, the wall 16 comprises at its upper end 22 openings 220 designed to receive removable mechanical fixing means 221 at a lower part of the bulkhead 12, consisting of pins 222 welded to the lower part of the bulkhead 12 which pass through the covering layer 20 and the insulating layer 19 and which are capable of receiving a butterfly nut 223. The presence of pins with butterfly nuts enables the customer to mount and dismantle the footrest without the use of tools.

As shown in FIG. 1, the rigid planar wall 16 further comprises in its lower end 24 a bearing zone 241 designed to be positioned so as to bear freely relative to the floor 14.

The shape of the rigid bearing wall 16 is adapted such that when the footrest is installed in the passenger compartment as explained above, the lateral edges 160 of the bearing wall 16 closely follow, on the one hand, the contour of the side of the central console (not shown) of the motor vehicle and, on the other hand, the contour of the wheel housing 25.

Thus installed between a lower part 12 of the bulkhead and the floor 14 of the vehicle, the wall 16 is arranged so that the external bearing face 17 is inclined to the front of the vehicle along a given inclination and an internal face 26 of the bearing wall 16 is positioned opposite the external face 202 of the covering layer 20. A volume which extends between the internal face 26 of the bearing wall 16 of the footrest and the external face 202 of the covering layer 20 thus remains available.

The bearing wall has lateral stiffening ribs RL and stiffening ribs RC located in a central zone of the wall 16.

First connecting members are provided so that a bottom wall 30 of a storage compartment 28 is removably fixed against the internal face 26 of the bearing wall 16, so that the internal volume of the storage compartment 28 extends between the internal face 26 of the bearing wall 16 and the external face 202 of the covering layer 20.

The first connecting members comprise fixed clips 161, 162, 163, 164 borne by the internal face 26 of the wall 16 and capable of cooperating with corresponding means 301, 302, 303, 304 borne by the bottom wall 30 of the storage compartment 28, so as to block the storage compartment 28 in a fixed manner against the internal face 26 of the bearing wall 16.

As shown in FIGS. 2 to 6, also provided are second connecting means which consist of fingers 171, 172, 173, 174 borne by a lower edge of the wall 30 and capable of cooperating with arcuate portions 181, 182, 183, 184 borne by a lower part of the bearing wall 16.

In the embodiment described, the storage compartment 28 is produced in a rigid manner by molding so as to be able to receive equipment used for the repair of tyres of the motor vehicle. In particular, the compartment 28 comprises a first housing 32 designed to receive a tank such as a container for a sealing product 33, a second housing 44 designed to receive a compressor 46, a third housing 52 designed to receive a towing ring and a fourth housing 62 designed to receive a hub cap hook.

As shown in FIGS. 1 to 4, the first housing 32 is located in an upper part of the compartment 28 and comprises a first wall 34 substantially perpendicular to the bottom wall 30, a free edge 36 thereof of substantially transverse orientation comprising a resilient blade 38 having a circular-arc-shaped profile capable of cooperating with the cylindrical body of the container 33 for the sealing product. The lateral edges 340 of the first wall 34 are extended laterally via two walls 342 substantially perpendicular to the wall 16 and capable of cooperating with end faces 330 of the container 33. The lateral walls 342 may comprise in the region of their free edge 344 opposing the bottom wall 30 a resilient folded-over portion 346 capable of cooperating with the end walls of the container 33. The resilient blade 38 in turn comprises on its free edge 380 a folded-over portion forming a hook 382, extending in a direction opposite the bottom wall 30. Thus, when the bearing wall 16 and the compartment 28 are arranged inside the vehicle, the resilient blade 38 is held under tension against the covering 20 so as to hold the container for the sealing product 33, the folded-over portion forming the hook 382 cooperating with the surface of the mat 20 so as to ensure additional support, guaranteeing the stability of the container 33 in the event of raised temperature, for example. The hook 382 has a second function of assisting the insertion of the container 33 in its housing when the compressor is already in place. Moreover, the bottom wall 30 has to the rear of the container 33 a low wall 40 of transverse orientation, designed to limit the movements of the container 33 to the rear.

In order to insert the container 33 inside the first housing 32, it is sufficient to slide it counter to the resilience of the folded-over portions 346 of the lateral walls 342 and the resilient blade 38 which deform by sliding along the wall 330 of the container 33 to permit it to pass. Once the container 33 is inserted in the housing 32, the blade 38 and the folded-over portions 346 of the lateral walls 340 bear under tension against the container 33 by following the contours. To remove the container 33, it is sufficient to pull on said container, the resilient blade 38 then deforming to permit the container 33 to be removed. Once the container 33 has been removed, the resilient blade 38 and the folded-over portions 346 return to their initial resting shape. The resilience of the walls 340 and the blade 38 thus permit mounting without clearance and without vibrations to be ensured, whilst ensuring easy storage and removal.

As shown in FIGS. 1 to 4, a lower part of the compartment 28 has two compression blocks 42, of hollow shape, comprising a lateral wall 420 extending from the bottom wall 30 and having a U-shaped profile, the opening thereof being oriented toward the rear of the vehicle when the footrest 10 is in place. The lateral wall 420 is closed in the region of an edge 422 opposing the bottom wall 30 by a contact wall 424 designed to bear against the covering 20 when the bearing wall 16 and the compartment 28 are put in position in the vehicle. The blocks 42 are made by molding with the compartment 28 and are aligned in a transverse direction. The contact wall 424 is shaped to follow closely the shape of the floor of the vehicle when the footrest 10 is put in place in the vehicle. Thus, the lateral walls 420 are capable of being deformed and collapsing under the effect of an impact so as to absorb energy in order to limit the risks of injury to the feet of the occupant resting on the bearing wall 16. The second housing 44 is designed to receive a compressor 46 of substantially parallelepipedal shape and having corners 460 and a peripheral lateral wall 464 which comprises a peripheral rib 462.

At the rear, the housing 44 consists of recesses 426 formed in the lateral wall 420 of the blocks 42 designed to receive two corners 460 of the compressor 46. Each recess 426 extends along a front portion 422a and an internal portion 422i of the lateral wall 422 of the blocks 42. "Internal portion" 422i of the lateral wall 422 is understood to be a part of the wall 422 located opposite the adjacent compression block 42. The two corners 460 of the compressor 46 are thus held between the bottom wall 30 and the edges of the recesses 426. The second housing 44 also comprises two rear clips 48 aligned in a transverse direction between the compression blocks 42, substantially in the region of a vertical edge 428 of the recesses 426. The two rear clips 48 take the form of lugs extending substantially perpendicular from the bottom wall 30 and comprising at their end a hook 480 capable of cooperating with the rib 462 located on the peripheral lateral wall 464 of the compressor 46. At the front, the second housing 44 comprises two lateral clips 50 capable of cooperating with the peripheral wall 464 of the compressor 46. The clips 50 here take the form of resilient tabs having a hook 500 capable of cooperating with the rib 462. Moreover, the low wall 40 of transverse orientation disclosed above forms a stop capable of limiting a movement of the compressor 46 to the front.

The second housing 44 is thus delimited by the rear recesses 426, the rear clips 48, the front lateral clips 50 and the low wall 40.

Moreover, the central stiffening ribs RC are located in the region of the second housing 44, on the internal face 26 of the bearing wall 16. In order to insert the compressor 46 inside the second housing 44, it suffices to slide the corners 460 into the recesses 426 and the rib 462 of the lateral wall 464 below the hooks 480 of the rear clips 48 by holding the compressor 46 obliquely and then rotating the compressor 46 in the direction of the bottom wall 30 about the corners 460 already inserted so as to introduce the remainder of the compressor 46 in the front part of the housing 44 between the two clips 50. During the insertion of the compressor 46, the front lateral clips 50 deform resiliently until the hooks 500 cooperate with the rib 462 of the lateral wall 464. To remove the compressor 46, the steps are carried out in reverse by lifting, at the front, the corners 460 of the compressor 46 to release the rib 462 from the front lateral clips 50, then pulling the compressor 46 by holding it obliquely to remove, at the rear of the housing 44, the corners 460 from the recesses 426 and to release the rib 462 from the rear clips 48.

The third housing 52 is designed to receive a towing ring 56 having a shank 560 and an annular head 562. It is arranged along a lateral edge 160 of the bottom wall 30 and is formed by at least one pair of resilient walls 54 substantially perpendicular to the bottom wall 30, opposing one another and located spaced apart from one another corresponding to the diameter of the shank 560 of the towing ring 56. In the embodiment described here, the third housing 52 has two pairs of walls 54. The third housing 52 further comprises a further pair of walls 58 arranged in a circular-arc-shaped and concentric manner so as to delimit the shape of the head 562 of the towing ring 56. The different pairs of walls 54, 58 have sufficient resilience to permit the insertion of the towing ring 56 by simply bearing in a direction substantially perpendicular to the bottom wall 30. The retention of the towing ring 56 is then ensured by the resilient walls 54, 58 bearing under tension against the towing ring 56. Moreover, the bottom wall 30 may also comprise a substantially semi-cylindrical recess 60 having the shape of the shank 560 of the towing ring 56. To remove the towing ring 56 from its housing 52, it thus suffices to exert traction in a direction perpendicular to the bottom wall 30. The walls 54, 58 then deform to permit the passage of the ring 56 and then return to their initial shape.

The fourth housing 62 designed to receive a hub cap hook 64 is located between the conical blocks 42. The hub cap hook 64 takes the form of a rigid metal wire, one end thereof 64a, the head 64, being curved so as to form a loop and the other end 64b being rectilinear so as to form a shank. The fourth housing 62 consists of a pair of clips 66 formed in the bottom wall 30 and aligned in a transverse direction and a second clip 68 located in front of the clips 66. The clips 66 are capable of receiving a terminal edge 64c of the head 64a of the hub cap hook 64, whilst the clip 68 is capable of receiving the shank 64b of the hook 64. To store the hook 64 in its housing 62, therefore, it suffices to introduce the terminal edge 64c of the head 64a of the hook, holding the hook 64 inclined, and then to pivot the hook 64 in the direction of the bottom wall 30 of the housing 28 until the clip 68 receives the shank 64b of the hook 64. To remove the hook 64, it suffices to carry out the procedure in reverse, by pulling on the shank 64b, pivoting the hook about the terminal edge 64c and then pulling the hook to release it from the clips 68.

Thus, the access to the storage compartment 28 integrated in the footrest 10 according to the invention is made very simple, in that it suffices simply to dismantle the removable mechanical fixing means connecting the footrest 10 to a part of the bulkhead to be able to have access to the rear of the footrest 10 where the storage compartment 28 is housed, without needing to handle the plate 16 covered with carpet 20. Thus it suffices to turn over the footrest 10 and to place it, for example, on the seat cushion of the passenger seat to have access to its contents. The access to the compartment thus only requires a few steps.

Moreover, this new fixed-type assembly between the plate 16 and the storage compartment 28 confers the assembly with improved static stability which provides a sensation of solidity to the customer when checking the quality of the assembly by pressing thereupon with the feet. Moreover, this impression of robustness is coupled with a significant increase in weight of approximately 25%.

The invention claimed is:

1. A footrest to be installed between a part of a bulkhead and a floor of a motor vehicle, comprising:
    a bearing wall to receive the foot or feet of a passenger of the motor vehicle; and
    a sound insulation mat capable of extending opposite at least one part of said bearing wall and attached to the floor of the motor vehicle, said mat comprising an insulating layer interposed between the floor and a covering layer attached to said insulating layer,
    wherein the bearing wall further comprises at least one storage compartment and an internal face to be positioned opposite an external face of the covering layer during installation of the footrest and the storage compartment extending between said internal face of the bearing wall and the external face of the covering layer,
    wherein the storage compartment has a bottom wall fixed permanently to the internal face of the bearing wall by first and second connecting members and comprising housings that are directly accessible without removing the bottom wall of the storage compartment from the bearing wall.

2. The footrest as claimed in claim 1, wherein the connecting members are fixed clips borne by the internal face of the bearing wall and capable of cooperating with complementary means formed in the bottom wall of the compartment.

3. The footrest as claimed in claim 1, wherein the connecting members are fingers borne by the bottom wall of the compartment and capable of cooperating with arcuate portions borne by the wall.

4. The footrest as claimed claim 1, wherein the bottom wall comprises at least one housing molded according to a predetermined shape, corresponding to the shape of at least one piece of equipment used for repair of tires of the motor vehicle.

5. The footrest as claimed in claim 4, wherein the at least one housing includes a first housing to receive a container for a sealing product having a cylindrical body and includes at least one wall substantially perpendicular to the bottom wall, one free edge thereof opposing the bottom wall being extended by a flexible blade having a circular-arc-shaped profile capable of cooperating with the cylindrical body of the container for the sealing product, by being held under tension.

6. The footrest as claimed in claim 5, wherein a free edge of the flexible blade is raised so as to form a locking means capable of cooperating with the covering layer when the footrest is in the position of use.

7. The footrest as claimed in claim 5, wherein the first housing further comprises lateral walls extending substantially perpendicular to the bottom wall from the one wall of the housing and capable of cooperating with end faces of the container for the sealing product.

8. The footrest as claimed in claim 7, wherein a free edge, opposing the bottom wall, of the lateral walls of the first housing have a resilient internal folded-over portion capable of being held under tension against the end faces of the container for the sealing product.

9. The footrest as claimed in claim 4, wherein the at least one housing includes a second housing to receive a compressor of substantially parallelepipedal shape and is delimited by recesses formed in lateral safety blocks borne by the bottom wall and capable of receiving two corners of the compressor via rear clips which are formed in the bottom wall between the safety blocks and which are capable of cooperating with a rib borne by a peripheral lateral wall of the compressor and front lateral clips capable of cooperating with the rib of the peripheral lateral wall.

10. The footrest as claimed in claim 4, wherein the at least one housing includes a third housing to receive a towing ring and includes at least one pair of clips formed in the bottom wall and opposing one another to delimit a first groove capable of receiving the shank of the towing ring and two concentric circular-arc-shaped walls formed in the bottom wall and delimiting a second groove capable of receiving the annular part of the towing ring.

11. The footrest as claimed in claim 4, wherein the at least one housing includes a fourth housing to receive a hub cap hook and includes two clips aligned transversely and formed in the bottom wall, designed to receive a portion of the head of the hook, and at least one further clip formed in the bottom wall and capable of receiving the shank of the hook.

12. The footrest as claimed in claim 1, wherein the bearing wall comprises at its upper end removable fixing means including a pin welded to the bulkhead and a butterfly nut.

* * * * *